United States Patent [19]
Finnigan et al.

[11] Patent Number: 5,904,943
[45] Date of Patent: *May 18, 1999

[54] TEXTURISED FOODSTUFFS

[75] Inventors: Timothy John Andrew Finnigan; Janine Anne Stephens, both of Cleveland, United Kingdom

[73] Assignee: Zeneca Limited, London, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/875,410
[22] PCT Filed: Jan. 9, 1996
[86] PCT No.: PCT/GB96/00025
   § 371 Date: Jul. 9, 1997
   § 102(e) Date: Jul. 9, 1997
[87] PCT Pub. No.: WO96/21362
   PCT Pub. Date: Jul. 18, 1996

[30] Foreign Application Priority Data

Jan. 12, 1995 [GB] United Kingdom ................ 9500579

[51] Int. Cl.$^6$ ....................................... A23L 1/04
[52] U.S. Cl. ...................... 426/89; 426/102; 426/105; 426/277; 426/281; 426/138; 426/574; 426/652; 426/802
[58] Field of Search ............... 426/573, 574–575, 426/577, 250, 540, 49.6, 138, 277, 652, 802, 805, 518, 105, 89, 102, 281

[56] References Cited

U.S. PATENT DOCUMENTS

| | | | |
|---|---|---|---|
| 2,786,763 | 3/1957 | Rivoche | 99/131 |
| 2,791,508 | 5/1957 | Rivoche | 99/131 |
| 3,093,483 | 6/1963 | Ishler et al. | 99/131 |
| 3,973,051 | 8/1976 | Buckley et al. | 426/574 |
| 4,341,806 | 7/1982 | Gadsby et al. | 426/511 |
| 4,347,261 | 8/1982 | Challen et al. | 426/573 |
| 4,348,418 | 9/1982 | Smith et al. | 426/104 |
| 4,367,240 | 1/1983 | Maclennan et al. | 426/28 |
| 4,407,832 | 10/1983 | Ferguson et al. | 426/281 |
| 4,436,759 | 3/1984 | Trilling et al. | 426/573 |
| 4,663,171 | 5/1987 | Chevrolet | 426/250 |
| 4,735,813 | 4/1988 | Spinoglio | 426/281 |
| 4,803,800 | 2/1989 | Romaine et al. | 47/1.1 |
| 5,080,918 | 1/1992 | Beauvais | 426/281 |
| 5,126,154 | 6/1992 | Beauvais | 426/281 |
| 5,503,647 | 4/1996 | Dahlberg et al. | 47/1.1 |

FOREIGN PATENT DOCUMENTS

| | | |
|---|---|---|
| 037 676 | 10/1981 | European Pat. Off. . |
| 2 377 771 | 8/1978 | France . |
| 2 007 077 | 5/1979 | United Kingdom . |
| 1 587 828 | 4/1981 | United Kingdom . |
| 2 137 226 | 10/1984 | United Kingdom . |
| 85/02759 | 7/1985 | WIPO . |

*Primary Examiner*—Cynthia L. Nessler
*Attorney, Agent, or Firm*—Pillsbury Madison & Sutro, LLP

[57] ABSTRACT

A texturised foodstuff is made by mixing a gell forming edible hydrocoloid (EH) with an edible filamentous fungus (EFF), gelling the EF to form a firm mass and mixing particles of the mass with EF in less gelled condition.

16 Claims, No Drawings

TEXTURISED FOODSTUFFS

This application was filed under 35 U.S.C. 371 as the national phase of international application PCT/GB96/00025, filed Jan. 9, 1996.

This invention relates to texturised foodstuffs.

It is known that foodstuffs can be made from edible filamentous fungi, for example *Fusarium graminearum*. It is desirable to provide means for producing foodstuffs of differing textures which comprise such fungi so that they can simulate foods of known types and produce foodstuffs of novel textures.

There is a considerable demand for burgers and sausages. This invention provides means whereby foodstuffs may be prepared from edible filamentous fungi (EFF) which simulate such products or provide satisfactory variants and alternatives thereto.

The invention comprises a process of making a texturised foodstuff comprising an edible filamentous fungus (EFF) which comprises mixing a gell forming edible hydrocolloid (EH) with EFF, gelling the EH to form a firm mass, mixing particles of the said mass with EH in a less gelled condition optionally admixed with EFF and suitably further gelling the EH after admixture and preferably freezing it to modify the texture. The mixture of EFF and EH which is gelled to form a firm mass (herein referred to as a paste) suitably comprises more than 50% EFF, for example 60 to 90% of the composition by weight. The EH content depends on the nature of the EH. In the case of an alginate it may be 0.2 to 1% and in the case of egg albumen it may be 2 to 5% by weight (as the diced material), the balance comprising 0 to 20% of free water, 0 to 5% preferably 1% to 5% and preferably 1 to 5% of fat or oil or fat or oil replacer, for example a polysaccharide fat or oil replacer and 0 to 3% flavouring by weight.

Preferably the paste is gelled at a temperature in the range 70 to 100° C. and more preferably 75–95° C. suitably without substantial dehydration. This may be accomplished in apparatus which restricts evaporative losses for example an enclosed vessel or by heating in the presence of water vapour preferably at least 90% relative humidity. The product may then be chilled if desired to facilitate handling.

Particles may be formed from the firm mass by mincing. Suitably the average particle diameter is 1 mm to 10 mm and preferably 2 mm to 5 mm. By "diameter" is meant the average width of a cross section of the particle through its centre. If the particle is elongated the cross section is transverse to its axis. The particles are preferably elongated and are suitably cylindrical and may be of length 5 to 100 mm for example 7 to 50 mm. The particles are then preferably frozen to a temperature in the range −30 to 5° C. and preferably −25° C. to −10° C., for example in a fluidised bed or blast freezer and stored in that temperature range until the free water content (as judged by the quantity of water expressed from the composition by moderate compression) has increased by a significant amount, for example 1 to 10% by weight of the total composition. The increase in free water content is accompanied by other physical changes which modify the texture. Suitably the time taken for this to occur is 3 days to 3 months and preferably 1 week to 2 months.

The particulate material so treated is then mixed with a gelling agent (which preferably comprise egg albumen and whey protein), and preferably EFF and also preferably flavouring and optionally fat e.g. hydrogenated flake fat, and/or preferably fat or oil replacers, for example polysaccharides e.g. starch and/or pectin and optionally water. Suitably the product comprises 5 to 50% and preferably 20 to 50% of the particulate material, 5 to 20% of added EFF, sufficient gelling agent to enable the mix to set to a solid on standing or heating, fat and/or oil and fat or oil replacers 0 to 10% and preferably 1 to 8% and water 0 to 30%, all percentages being by weight of the total mixture.

In order to produce desired particle size distributions in the mix, some particles may be added frozen and others thawed. Any thawed particles are preferably added late in the mixing process to prevent undue disintegration. Suitably however all particles are added frozen. It is preferred to carry out the mixing at temperature of −5 to 15° C. and preferably −2 to +5° C. either by precooling the added components or cooling the mix for example in a cold jacketed mixer or with cold $CO_2$ gas.

The mix is then suitably formed into a desired shape preferably at the mixing temperature and then gelled. In the case of a proteinaceous gelling agent this normally requires heating to a temperature in the range 70 to 100° C. and more preferably 70 to 95° C., suitably without dehydration and then cooling. Alginate gelling agents do not necessarily require a heating stage to cause gelation, which may be accomplished by known means, for example, the addition of sequestered calcium ions e.g. calcium citrate which may be supplied as a soluble calcium salt, for example the chloride or nitrate and a suitable sequestrant for example citric or tartaric acid or glucono δ-lactone.

The product is then preferably frozen and stored for at least 3 days and preferably at least seven days at a temperature of suitably −30 to −5° C. and preferably −25 to −10° C. which further improves the texture.

Suitably the mix may be made into burgers or sausages. In the case of sausages the forming stage may be carried out with the mix contained in a sausage skin for ease of shaping and handling but any form of moulding may be employed. If a sausage skin is used it may if desired be removed from the sausage to leave a skinless sausage. The sausage skins are preferably made from an edible film which may be a hydroxybutyrate/valerate copolymer.

As the invention comprises foodstuffs of textures in which more firmly gelled particles comprising EFF are present in a matrix of less firmly gelled material the textures may be varied by altering the particle sizes, the extent of gelling and the difference in gelling between the particles and the matrix to give a wide range of textures. This versatility is very useful in the manufacture of sausages.

EXAMPLE 1

Burgers were made by the following process.

A mass of *Fusarium araminearum* Schwabe IMI 145425 (ATTC 20334 deposited with the American type Culture Collection, 12301 Parklawn Drive, Rockville Md. 20852) (EFF) which had been treated to reduce its RNA content to less than 2% by weight by heat treatment was divided into two parts. One part (84.4% by weight) was mixed with egg albumen powder (3.35% by weight), water (10.13% by weight), fat (1.69 % by weight) and malt extract (0.63% by weight) and formed into a billet and heated by steam at 100° C. atmospheric pressure to a temperature at the centre of about 95° C. over a period of 30 minutes. The product was then chilled to below 4° C. and minced at that temperature to produce cylinders of average diameter 3.5 mm and average length 10 mm. The mince was then stored at −18° C. for 3 weeks.

The other part of the *Fusarium araminearum* (13.2% by weight) was mixed with frozen mince (12.44% by weight), water (21%), diced onion (10.19%), dried egg albumen (2.13%) whey protein (2.10%), tapiocaline starch (1.1%), malt extract (0.7%), hydrogenated fat (2.2%), pectin (0.68%), chagrill beef flavour (1.7%), garlic flavour (0.56%), onion flavour (0.8%) and other flavourings (2.2%) and to that mix was then added (with cooling) thawed mince (29%) all percentages being by weight based on the total mix. In an alternative procedure the mince was added in frozen condition in one operation.

The final mix was formed into burger shapes, which were heated to 95° C.+ in steam at atmospheric pressure and then chilled to under 4° C. The burgers were than stored for at least 7 days at −18° C.

The burgers on normal cooking were found to be very palatable and underwent little shrinkage. They can be satisfactorily cooked by microwaves as well as by frying or cooking in a conventional oven.

Sausages were made by the following process. A mass of the *Fusarium araminearum* (EFF) which had been treated by heating to reduce its RNA content to less than 2% by weight was mixed with egg albumen, water, fat and malt extract in the following percentages, by weight—mycoprotein 84.4, egg albumen 3.18, water 10.13, fat 1.69 and malt extract 0.63, and formed into a billet. The billet was heated by steam at 100° C. (atmospheric pressure) to a centre temperature of approximately 95° C. over a period of 30 minutes. The product was then chilled to below 4° C. and then minced at that temperature. The mince so produced was blast frozen at −18° C. and then stored for 3 weeks at −20° C.

A further mix was produced comprising 20% of the mince 27.2% of EFF, 32.45% water, 8% dried onion, 2.1% dried egg albumen, 2.1% dried whey protein, 1.75% tapiocaline starch, 3.0% hydrogenated fat, 0.7% pectin, 0.1% malt extract, and 2.6% flavouring.

This final mix was extruded into a casing to form linked sausages which were then heated to a centre temperature of 95° C. by atmospheric steam followed by chilling to less than 4° C. The sausages so formed may be if desired de-skinned, and are then blast frozen at −18° C., followed by frozen storage at −20° C. for 3 weeks.

The product is very palatable and undergoes no visual shrinkage on subsequent reheating. This reheating may be affected by microwaves, as well as any standard method of preparing sausages (frying, baking or grilling).

We claim:

1. A process of making a texturised foodstuff simulating the texture of burgers or sausages and comprising an edible filamentous fungus which comprises mixing a gell forming edible hydrocolloid with said edible filamentous fungus, gelling the gell forming edible hydrocolloid to convert the mixture to a firm mass, forming particles from said firm mass, and mixing particles of said mass with further gell forming edible hydrocolloid which is admixed with an edible filamentous fungus and is in a less gelled condition to obtain said texturised foodstuff.

2. A process according to claim 1 which comprises further gelling the gell forming edible hydrocolloid after mixing said particles with gell forming edible hydrocolloid in less gelled condition.

3. A process as claimed in claim 1 in which the texture of the mixture of said particles and gell forming edible hydrocolloid in less gelled condition is modified by freezing said mixture.

4. A process as claimed in claim 1 in which the firm mass comprises 60 to 90% of edible filamentous fungus.

5. A process as claimed in claim 1 in which the firm mass contains as the edible hydrocolloid 2 to 5% by weight of egg albumen or 0.2 to 1% by weight of an alginate.

6. A process as claimed in claim 1 in which the firm mass comprises 0 to 20% of free water, 0 to 5% of a member of the group consisting of fat, oil, fat replacer and oil replacer and 0 to 3% flavouring by weight.

7. A process according to claim 6 in which the firm mass is gelled at a temperature of 75 to 95° C. without substantial dehydration.

8. A process according to claim 7 in which the particles are elongated and have an average diameter of 1 to 10 mm and an average length of 5 to 100 mm.

9. A process as claimed in claim 1 in which the particles are stored at −30 to 5° C. until the free water content, as judged by the quantity of water expressed from the composition by moderate compression, has increased by 1 to 10% by weight of the total composition of the particles.

10. A process as claimed in claim 1 in which from 5 to 50% by weight of the particles is mixed with 5 to 20% by weight of added edible filamentous fungus, from 0 to 10% by weight of a polysaccharide fat or oil replacer and sufficient gelling agent to enable the mix to set to a solid on standing or heating.

11. A process according to claim 1 in which during the mixing of particles with gell forming edible hydrocolloid in a less gelled condition some particles are mixed frozen and some thawed.

12. A process as claimed in claim 11 in which the thawed particles are added late in the mixing process.

13. A process as claimed in claim 11 in which the mixing of the particles with gell forming edible hydrocolloid in less gelled condition is carried out at −5 to 15° C.

14. A process as claimed in claim 13 in which the texture of the mixture is improved by storing it at −30 to 5° C. for at least seven days.

15. A process as claimed in claim 1 in which the mixture of particles with gell forming edible hydrocolloid in less gelled condition is formed into a desired shape and then gelled.

16. A process as claimed in claim 14 in which the mixture is formed into a sausage shape by enclosing it in a sausage skin and optionally removing the skin to produce a skinless sausage.

* * * * *

UNITED STATES PATENT AND TRADEMARK OFFICE
CERTIFICATE OF CORRECTION

PATENT : 5,904,943
DATED : May 18, 1999
INVENTOR(S) : FINNIGAN et al.

It is certified that error appears in the above-identified patent and that said Letters Patent is hereby corrected as shown below:

Column 2 line 49, change "*Fusarium araminearum*" to

--*Fusarium graminearum* –

Column 2 line 64, change "*Fusarium araminearum*" to

--*Fusarium graminearum* –

Column 3 line 17, change "*Fusarium araminearum*" to

--*Fusarium graminearum* –

Signed and Sealed this

Fifteenth Day of May, 2001

Attest:

NICHOLAS P. GODICI

Attesting Officer

*Acting Director of the United States Patent and Trademark Office*